(12) United States Patent
York et al.

(10) Patent No.: US 8,227,538 B2
(45) Date of Patent: Jul. 24, 2012

(54) RUBBER MIXTURE WITH IMPROVED ABRASION

(75) Inventors: William Michael York, Concord, NC (US); Carla Recker, Hannover (DE); Katharina Herzog, Harsum (DE); Hajo Weinreich, Hessisch Oldendorf (DE); Boris Mergell, Barsinghausen (DE); Viktoriya Tkachenko, Hannover (DE); Norbert Mueller, Nienhagen (DE); Juergen Wagemann, Bad Salzdetfurth (DE)

(73) Assignee: Continental AG, Hannover (DE)

( * ) Notice: Subject to any disclaimer, the term of this patent is extended or adjusted under 35 U.S.C. 154(b) by 376 days.

(21) Appl. No.: 12/156,803

(22) Filed: Jun. 5, 2008

(65) Prior Publication Data

US 2009/0306267 A1  Dec. 10, 2009

(51) Int. Cl.
| | |
|---|---|
| C08K 3/18 | (2006.01) |
| C04B 28/26 | (2006.01) |
| C04B 24/26 | (2006.01) |
| A61K 9/16 | (2006.01) |
| B60C 1/00 | (2006.01) |
| C08J 3/00 | (2006.01) |
| C08L 23/06 | (2006.01) |

(52) U.S. Cl. ........ 524/430; 524/543; 524/442; 524/552; 524/575.5; 524/571; 524/579; 524/570; 524/585
(58) Field of Classification Search .......... 524/430, 524/543, 442, 552, 575.5, 571, 579, 570, 524/585
See application file for complete search history.

(56) References Cited

U.S. PATENT DOCUMENTS

| | | | |
|---|---|---|---|
| 5,342,900 A | 8/1994 | Wolpers et al. | |
| 6,359,045 B1 | 3/2002 | Jeske et al. | |
| 7,189,866 B2 | 3/2007 | Belin et al. | |
| 2002/0058760 A1 | 5/2002 | Jeske et al. | |
| 2002/0115767 A1* | 8/2002 | Cruse et al. | 524/262 |
| 2005/0124740 A1 | 6/2005 | Klockmann et al. | |
| 2005/0277717 A1* | 12/2005 | Joshi et al. | 524/261 |
| 2006/0161015 A1 | 7/2006 | Klockmann et al. | |
| 2007/0066744 A1* | 3/2007 | Weydert et al. | 524/493 |
| 2008/0161452 A1 | 7/2008 | York et al. | |
| 2008/0161460 A1 | 7/2008 | York et al. | |
| 2008/0161462 A1 | 7/2008 | York et al. | |
| 2008/0161475 A1 | 7/2008 | York et al. | |
| 2008/0161486 A1 | 7/2008 | York et al. | |

FOREIGN PATENT DOCUMENTS

| | | |
|---|---|---|
| DE | 25 36 674 A1 | 2/1977 |
| DE | 40 36 420 A1 | 5/1991 |
| DE | 40 37 756 A1 | 6/1991 |
| DE | 42 07 028 A1 | 9/1992 |
| DE | 603 03 203 T2 | 9/2006 |
| EP | 0 530 590 B1 | 3/1993 |
| EP | 1000968 | 5/2000 |
| EP | 1533336 | 5/2005 |
| GB | 1524077 | 9/1978 |
| WO | WO 2008/009514 | 1/2008 |

OTHER PUBLICATIONS

Hofmann & Gupta: Handbuch der Kautschuktechnologie, Gupta-Verlag (2001), chapter 7, pp. 6-53.
International Search Report dated Aug. 5, 2009.
DIN53 504; Oct. 2009.
DIN 53 505; Aug. 2000.
DIN 53 512; Apr. 2000.
DIN 53 529; Mar. 1983; Part 1; English Translation.
DIN 53 529; Mar. 1983; Part 2; English Translation.
DIN 53 529; Mar. 1983; German Translation.
DIN 53 529; Jun. 1983; German Translation.
DIN 53 529; Apr. 1991; German Translation.
DIN ISO 4649; Nov. 2006.

* cited by examiner

Primary Examiner — William Cheung
(74) Attorney, Agent, or Firm — Collard & Roe, P.C.

(57) ABSTRACT

A rubber mixture with improved abrasion with improved abrasion performance, in particular for pneumatic tires, has the following composition: from 30 to 100 phr of at least one diene rubber; from 0.1 to 10 phr of at least one vulcanization accelerator selected from the group consisting of: thiazole accelerators, mercapto accelerators, sulfenamide accelerators, guanidine accelerators, thiuram accelerators, dithiocarbamate accelerators, amine accelerators, thioureas, and/or other accelerators; and a vulcanization system of sulfur comprising elemental sulfur, sulfur donor and silane between 0.25 and 0.08 moles per 100 parts by weight of the rubber elastomer, whereby the free sulfur contributes in the range of 0 to 70%, the sulfur donor contributes in the range of 5 to 30%, and the silane contributes in the range of 20 to 95%.

24 Claims, No Drawings

RUBBER MIXTURE WITH IMPROVED ABRASION

BACKGROUND OF THE INVENTION

1. Field of the Invention

The invention relates to a rubber mixture with improved abrasion performance, in particular for tires.

2. The Prior Art

A very wide variety of additives is admixed with the mixtures in order to influence the properties of the mixture and of the vulcanizate, and/or specific polymers are used for this purpose. Examples that may be mentioned here of additives are fillers (e.g. carbon black), plasticizers, antioxidants, and crosslinking systems composed of sulfur, accelerators, and activators. However, if one property is improved by varying the mixture, this is often attended by impairment of another property, and there are therefore certain conflicts of objectives. Examples of these conflicting objectives in the case of mixtures for tire treads are found in relation to abrasion performance and increased build-up of heat, which causes poorer rebound resilience and therefore poorer rolling resistance. A particular method used to solve these conflicts of objectives is variations in the constitution of the mixture, and also in particular changes or modification in additives, the aim being to achieve an improved level of properties which are usually inversely correlated.

An important group of additives which influences vulcanization rate and the physical properties of the vulcanizates is the group of the vulcanization accelerators. There are various groups of vulcanization accelerators available for production of tires and known to the person skilled in the art, and these can also be used in combination with one another, sometimes giving synergistic effects.

These vulcanization accelerators serve for activation of the sulfur used as vulcanizing agent. The addition of sulfur and vulcanization accelerator here is individually matched to the tire-rubber-mixture properties to be achieved. These properties to be achieved are a function of the network produced during vulcanization, e.g. between polymer and fillers, and great importance can therefore be attached to the nature and the degree of crosslinking with a view to the physical properties of the vulcanizates.

The prior art in relation to vulcanization systems or crosslinking systems will now be described in more detail, using the following publications:

(D1) DE 25 36 674 A1 (corresponds to GB 1,524,077)
(D2) DE 603 03 203 T2
(D3) DE 42 07 028 A1
(D4) DE 40 36 420 A1
(D5) DE 40 37 756 A1
(D6) EP 0 530 590 B1
(D7) U.S. Pat. No. 7,189,866

D1 describes a crosslinkable rubber mixture comprising silicatic fillers, and a crosslinking process. Very generally, a crosslinkable rubber mixture is described here comprising at least from 1 to 300 parts by weight of a silicatic filler, from 0 to 300 parts by weight of carbon black, and amounts of from 0.02 to 10 parts by weight of at least one vulcanization accelerator known per se for rubber vulcanization, and at least one organosilane. No defined polymer system is claimed, and no specifying data are given concerning the fillers to be used.

D2 discloses a polysulfide siloxane that can be used as crosslinking agent, and the process for its preparation. The crosslinking system here encompasses the polysulfide siloxane described and at least one primary vulcanization accelerator. The polysulfide siloxane is used in a composition based on a diene elastomer and on a reinforcing filler. The diene elastomer described here comprises various components and the fillers described here comprise in particular silica and carbon black, and each of the examples disclosed here relates to a rubber mixture composed of natural rubber as single polymer and carbon black as single filler.

D3, D4, and D5 disclose vulcanizates for hoses, gaskets, and roller rings and other technical rubber items with no nitrosamine toxicity, preferably comprising specific thiuram and/or mercapto vulcanizing agents, and nevertheless still mostly needing small amounts of elemental sulfur for vulcanization or crosslinking.

D6 discloses a process for the production of diene rubber vulcanizates with very high aging resistance and reversion resistance. The diene rubber vulcanizates here comprise from 1 to 2.5 parts of mercapto accelerator or from 0.2 to 0.8 part of sulfenamide accelerator, or from 0.3 to 2.5 parts of mercapto accelerator and from 0.1 to 0.8 part of sulfenamide accelerator. From 0.1 to 0.2 part of sulfur is also used per 100 parts of rubber, preferably of an oil-extended diene rubber.

D7 relates to cross-linking agents usable for cross-linking elastomeric networks, in particular in the manufacture of tires or semi-finished products for tires. In the examples the process is carried out with the cyclic polysulfurized tetramethyldisiloxane. This process shows that it is possible to cross-link without the addition of sulfur, a rubber composition. Also demonstrated is improvement in the thermal stability (reversion behaviour) of the compositions based on the polysulfide according to D7.

The disclosure of each of the above prior art documents is herewith incorporated by reference.

SUMMARY OF THE INVENTION

It is an object of the present invention to provide a rubber mixture which solves or at least mitigates the abovementioned conflict of objectives, and specifically by using an optimized vulcanization system for improving abrasion performance while other physical properties remain almost unaltered.

This object is achieved by providing a rubber mixture with the following composition:
  from 30 to 100 phr of at least one diene rubber;
  from 20 to 200 phr of a filler;
  from 0 to 200 phr of other or further additives;
  a vulcanization system of sulfur comprising elemental sulfur, sulfur donor and silane with a sulfur concentration caused by these ingredients between 0.025 and 0.08 moles per 100 parts by weight of the rubber elastomer, whereby the free sulfur contributes in the range of 0 to 70%, the sulfur donor contributes in the range of 5 to 30%, and the silane contributes in the range of 20 to 95%; and
  0.1 to 10 phr of at least one vulcanization accelerator.

More particularly the present invention provides a rubber mixture having the composition comprising:
  from 30 to 100 phr of at least one diene rubber;
  from 20 to 200 phr of a filler;
  from 0 to 200 phr of other or further additives;
  a vulcanization system of sulfur comprising elemental sulfur, sulfur donor and silane with a sulfur concentration caused by these ingredients between 0.025 and 0.08 moles per 100 parts by weight of the rubber elastomer, whereby the free sulfur contributes in the range of 0 to 70 mole %, the sulfur donor contributes in the range of 5 to 30 mole %, and the silane contributes in the range of 20 to 95 mole %; and 0.01 to 10 phr of at least one vulcanization accelerator;
and wherein a surprisingly good abrasion performance can be achieved, while other physical properties remain at the same level; and
all of the mole percentages are referred to the sulfur concentration of the vulcanization system.

It is also advantageous to include zinc oxide and stearic acid as vulcanization activators.

The phr data (parts per hundred parts of rubber by weight) used in this specification are the usual quantitative data for mixing formulations in the rubber industry. The number of parts by weight added of the individual substances here is always based on 100 parts by weight of the entire weight of all of the rubbers present in the mixture.

Surprisingly, it has been found that improved results occur when the vulcanization system has the main characteristics which are the total sulfur amount introduced by free sulfur, silane, and sulfur donor and the specific ratio of the sulfur introduced by these three sources. State of the art, e.g., for low sulfur contents is given by C3, but usually these recipes do not contain any or only minor sulfur donor contents. By adding the sulfur composition in the inventive manner, a surprisingly good abrasion performance can be achieved. Indeed the result is an improvement in the abrasion value, while other physical properties remain at the same level.

This permits decoupling of the conflicting objectives of, for example, rolling resistance and abrasion. This applies not only to the tread but also to other tire components, e.g. the side wall. The umbrella terms body compounds or body mixtures are also used below for the rubber mixtures for the other tire components, as is conventional in tire technology.

At least one diene rubber has been selected from the group consisting of natural polyisoprene, and/or synthetic polyisoprene, and/or polybutadiene, and/or styrene-butadiene copolymer, and/or solution-polymerized styrene-butadiene copolymer, and/or emulsion-polymerized styrene-butadiene copolymer, and/or styrene-isoprene-butadiene terpolymer, and/or butadiene-isoprene-copolymer, and/or butyl rubber, and/or halobutyl rubber, and/or ethylene-propylene-diene rubber, and/or chloroprene rubber, and/or butadiene-acrylonitrile-copolymer, and/or partly hydrogenated diene (co-) polymers. The polymers can be unfunctionalized or functionalized, also mixtures of functionalized and unfunctionalized polymers are possible.

Different applications in tires (tread/body, pass car/truck tire) are connected with different preferred polymer compositions:
Passenger Car (PC) Tread:
The rubber mixture preferably comprises at least one styrene-butadiene rubber (SBR, preferably a solution-polymerized styrene-butadiene rubber (SSBR).
Truck Tread:
The rubber mixture preferably comprises 40 to 100 phr natural rubber, 0 to 50 phr butadiene rubber, 0 to 60 phr SBR, preferably solution SBR
Body:
The rubber mixture preferably comprises 20 to 100 phr natural rubber, 0 to 80 phr butadiene rubber, 0 to 50 phr SBR Fillers may be mentioned here as a separate constituent of the additives. The quantitative proportion of the fillers comprises from 20 to 200 phr of at least one filler. Preferably at least 10 phr of one filler should have a silane reactive groups on its surface like OH-groups which can be selected out of the fillers known like amorphous silica, other mineral fillers, or modified polymer microgels like Nanoprene (LanXess).

If amorphous silica is used as the major filler ingredient, this has a conventional specific surface area between 100 to 300 $m^2/g$ measured as BET Surface (Nitrogen adsorption), preferred 120 to 250, and more preferred 140 to 220. If carbon black is used as the major filler ingredient, its iodine absorption number is from 80 to 300 g/kg and its DPB number is from 115 to 200 cm3/100 g. However, a combination composed of amorphous silica with the properties mentioned and carbon black with the properties mentioned can also be used as the main two filler ingredients.

For different applications are different preferred total loadings for the filler as well: PC tread 50 to 200 phr, preferred 60 to 150 phr; Truck Tread 40 to 70 phr, preferred 40 to 55 phr; Body: 30 to 80 phr.

The rubber mixture can optionally also include, along with silica and/or carbon black, other fillers, such as aluminum hydroxide, phyllosilicates, chalk, starch, magnesium oxide, titanium dioxide, rubber gels, short fibers, etc., in any desired combination.

Useful silanes as part of the vulcanization system and their classification are as follows:
The silanes known in rubber industry can be classified by the S:Si ratio in the molecule, the absolute number of Si atoms in the molecule and the 'Mw per Si-atom' ratio:

Class 1: S:Si>1.6, no of Si-atoms>1, Mw per Si-atom ratio<390 g/mol comprises e.g., organosilanes as described in D1 for x (average)>3, e.g. represented by Si69 (TESPT) from Evonik/Degussa or by appropriate silanes described in U.S. application Ser. No. 11/617,683, U.S. Ser. No. 11/617,649, U.S. Ser. No. 11/617,663, U.S. Ser. No. 11/617,659, Class 2: S:Si<1.6, no of Si atoms>=1 and Mw per Si-atom ratio<390 g/mol comprises e.g., organosilanes as described in D1 for x (average)<3 represented e.g. by Si75 (TESPD) from Evonik/Degussa or by appropriate silanes described in U.S. application Ser. No. 11/617,683, U.S. Ser. No. 11/617,649, U.S. Ser. No. 11/617,663, U.S. Ser. No. 11/617,659, or NXT, NXT low VOC, or NXT-Z types by Momentive Performance Materials Class 3: S:Si open, absolute no of Si atoms>=1 and Mw per Si-atom ratio>390 g/mol e.g., represented by Si363 from Evonik/Degussa (described in US20060161015) or silanes described in WO2008009514 or appropriate silanes described in U.S. application Ser. No. 11/617,678

Silanes of these three categories have preferred embodiments of the vulcanization system composition.

Sulfur donors comprise curing agents donating sulfur to the network as they are known by persons skilled in the art or described e.g., in Hofmann & Gupta: Handbuch der Kautschuktechnologie, Gupta-Verlag (2001), chapter 7, like Thiuramdisulfide, preferred TBzTD, or Dithiophosphates like DipDis (bis(diisopropyl)thiophosphoryl Disulphide), SDT (e. g. Rhenocure SDT 50, Rheinchemie GmbH), Ziacdichloryl-dithiophosphate (ZDT) (e.g. Rhenocure ZDT/S, Rheinchemie GmbH)

There are from 0.1 to 10 phr of at least one vulcanization accelerator which is selected from the group comprising thiazole accelerators, mercapto accelerators, sulfenamide accelerators, guanidine accelerators, thiuram accelerators, dithiocarbamate accelerators, amine accelerators, thioureas, and/or other accelerators excluding those which are sulfur donors.

The quantitative proportion of the vulcanization accelerator is preferably from 1 to 6 phr, and preferably at least one accelerator here is selected from the groups of the sulfenamide accelerators, preferably to use N-tert-butyl-2-benzothiazolesulfenamide (TBBS), or cyclohexylbenzothiazolesulfenamide (CBS).

Preferred is a sulfur donor to sulfenamide molar ratio of 0.35 to 0.6, preferred 0.45 to 0.55.

Furthermore free sulfur is added from 0 to 70% of the sulfur introduced by the vulcanization system ingredients as defined above.

The usual total quantitative proportion of the further or other additives is from 0 to 200 phr. The additives comprise e.g. the vulcanization aids other than accelerators, sulfur donors and sulfur known by persons skilled in the art like, e.g., ZnO, stearic acid, resins etc. Other additives include one or more processing aids, one or more plasticizers, one or more antiozonants, and one or more antioxidants. Further additives well known in rubber-mixing technology can also be added, if appropriate. The other and further additives may range from 0 to 200 phr.

The additives moreover comprise from 0 to 120 phr of at least one plasticizer oil, the plasticizer oil being e.g. a mineral oil selected from the group comprising of DAE (Distillated Aromatic Extracts) and/or RAE (Residual Aromatic Extract) and/or TDAE (Treated Distillated Aromatic Extracts) and/or MES (Mild Extracted Solvents) and/or naphthenic oils.

From 0 to 80 phr of at least one other additional plasticizer can also be present in the rubber mixture. This other plasticizer can be a synthetic plasticizer and/or a fatty acid and/or a fatty acid derivative and/or a resin and/or a factice and/or a low molecular weight polymer and/or a vegetable oil.

The rubber mixture of the invention can be used for the production of a tire. This can be a solid rubber tire, or a pneumatic tire. A particularly important application here is the use in the tread of a pneumatic tire and in a body mixture for a pneumatic tire. The expression body mixture here includes side wall, inner liner, apex, belt, shoulder, belt profile, squeegee, carcass, and/or bead reinforcement.

The following is based upon the different compositions containing different ingredients which illustrate several specific preferred ranges depending on the class of silane and compound application as examples:

Preferred for PC Tire Tread Applications:

Sulfur concentration: 0.05 to 0.075 moles per 100 parts by weight of the rubber elastomer; free sulfur 0 to 10%, preferred 0 to 2%; sulfur donor 5 to 13%, preferred 7 to 13%; silane 75 to 90%; if S to Si-ratio in silane is>1.6, no of Si-atoms>1, Mw per Si-atom ratio<390 g/mol (class 1) preferably silica amounts to 45 to 150 phr (E1, E2, E4 to E11, E16, E20 to E23).

Sulfur concentration: 0.035 to 0.07 moles per 100 parts by weight of rubber elastomer; free sulfur 20 to 50%, preferred 24 to 45%; sulfur donor 5 to 20%, preferred to 18%; silane 50 to 70%; if S:Si<1.6, no of Si atoms>=1 and Mw per Si-atom ratio<390 g/mol (Class 2) preferably silica amounts to 45 to 150 phr (E3, E12 to E15, E17, E24 to E26).

Sulfur concentration: 0.025 to 0.05 moles per 100 parts by weight of rubber elastomer; free sulfur 20 to 60%, preferred 25 to 50%; sulfur donor 10 to 30%, preferred from 15% to 28%; silane 25 to 70%; if S:Si open, absolute no of Si atoms>=1 and Mw per Si-atom ratio>390 g/mol (class 3) preferably silica amounts to 45 to 150 phr (E18, E19).

Preferred Example for Tire Sidewall:

Sulfur concentration: 0.025 to 0.05 moles per 100 parts by weight of rubber elastomer; free sulfur to 0 to 55%; sulfur donor 8 to 20%; silane 40 to 95%; if S to Si-ratio in silane is>1.6, no of Si-atoms>1, Mw per Si-atom ratio<390 g/mol (class 1) preferably silica amounts 10 to 50 phr (E27 to E28).

Preferred Example for Truck Tread:

Sulfur concentration: 0.025 to 0.05 moles per 100 parts by weight of rubber elastomer; free sulfur 0 to 55%; sulfur donor 8 to 15%; silane 40 to 95%; if Mw per Si-atom ratio<390 g/mol (class 1 and 2) preferably silica amounts to 20 to 70 phr (E31 to E38).

Further Additional Features:
1. The compound also comprises an sulfenamide type of accelerator, preferably CBS or TBBS, more preferably in a sulfur donor to sulfenamide accelerator molar ratio of 0.35 to 0.6, preferred 0.45 to 0.55.
2. Sulfur donors are thiruam disulfides or thiophosphates, preferred TBzTD or SDT or DipDis or ZDT.
3. Silanes are TESPT or TESPD, like, for example, Si69 and Si75 sold by Evonik Industries AG, or mercaptosilanes, which can be blocked or unblocked, like, for example, Si363 (Evonik Industries AG) or NXT-type silanes, NXT-Z type silanes, NXT low VOC-type silanes (all Momentive Performance Materials Inc.) or silated core silanes.
4. At least one filler which preferably has OH groups on the filler surface like Silica, other metal oxides, or microgels like Nanoprene (1-6 OH-groups per nm2).
5. Unsaturated elastomers comprises SBR, BR, NR, IR, SIR, SIBR, IBR, EPDM, or mixtures thereof.
6. Softener comprise mineral oils, vegetable oils, esters, low Mw-polymers, or blends thereof.

Quantitative Composition:
- 30-100 phr unsaturated rubber (e.g. for pass car tread: SBR/BR 0-50 phr; NR 0-50 phr, preferably 0-30 phr, preferably 0-20 phr);
- all additional fillers without OH-groups can be used (Carbon Black (0-100 phr, preferably 0-80 phr, preferably 0-5 phr), chalk, etc.);
- 0-120 phr softener, preferably 0-90 phr, preferably 0-80 phr,
- 0-60 phr additional ingredients, preferably 0-40 phr (ozone protection waxes, resins, ZnO, anti-aging preservatives, etc).

The invention rubber mixtures are useful for tires, tire tread, tire body compounds, hoses, conveyor belts, airsprings, drive belt, etc.

As an example the following mixing procedure and equipment was used to obtain the described compounds, but other appropriate mixing equipment and procedures known by persons skilled in the art are possible as well. The compounds in all Examples mixed in an instrumented "OOC" BANBURY® (Farrell Corp.) mixer with a 158 cu. in. (2,600 cc) chamber volume. The mixing of the rubber was done in three steps. The mixer was turned on with the mixer at 80 rpm and the cooling water at 71° C. The rubber polymers were added to the mixer and ram down mixed for 30 seconds. The silica and the silane were added to the mixer and ram down mixed for 30 seconds. The other ingredients in the Masterbatch of Table 1 except for the oils were added to the mixer and ram down mixed for 60 seconds. The mixer speed was reduced to 65 rpm and then the oils of the Masterbatch were added to the mixer and ram down mixed for 60 seconds. The mixer throat was dusted down and the ingredients ram down mixed until the temperature reached 150° C. The ingredients were then mixed for an additional 3 minutes and 30 seconds. The mixer speed was adjusted to hold the temperature between 150 and 155° C. The rubber was dumped (removed from the mixer), a sheet was formed on a roll mill set at about 85° to 90° C., and then allowed to cool to ambient temperature.

In the second step, the Masterbatch was recharged into the mixer. The mixer's speed was 80 rpm, the cooling water was set at 71° C. and the ram pressure was set at 25 psi. The Masterbatch was ram down mixed for 150 seconds while the temperature of the Masterbatch was brought up to 150° C., and then the mixer's speed was reduce to 50 rpm. The rubber was mixed for 40 seconds at temperatures between 150 and 155° C. After mixing, the rubber was dumped (removed from the mixer) and a sheet was formed on a roll mill set at about 85° to 90° C. The rubber was allowed to cool to ambient temperature.

In the third step, the mixer's speed was set to 50 rpm, the cooling water was set at 71° C. and the ram pressure was set at 25 psi. The rubber Masterbatch and the curatives were ram down mixed for 190 seconds while the temperature of the Final Mix was brought up to 115° C. After mixing, the rubber was dumped (removed from the mixer), a sheet was formed on a roll mill set at about 85° to 90° C., and then allowed to cool to ambient temperature. The curing condition was 160☐ C for 20 minutes. The test procedures were described in the following ASTM/DIN methods:

| | |
|---|---|
| Mooney Scorch | ASTM D1646 |
| Mooney Viscosity | ASTM D1646 |
| Rheometer (MDR 2000) | DIN 53529 |
| Storage Modulus, Loss Modulus, Tensile and Elongation | DIN 53504-R1 |
| Shore A Hardness | DIN 53505 |
| Rebound | DIN 53512, ASTM D1054 |
| DIN Abrasion | DIN 53516 |

DETAILED DESCRIPTION OF PREFERRED EMBODIMENTS

The invention will now be explained in more detail using comparative examples and inventive examples, collated in the following tables.

Table 1 shows the composition of the mixture, and also shows the associated laboratory test results, as well as showing the test results obtained directly on a tire.

Rubber mixture C1 is a comparative mixture containing elemental sulfur, while rubber mixture E1 was vulcanized inventively without the addition of, or devoid of and free from elemental sulfur.

In all of the mixture examples shown in the table, the quantitative-proportion data are parts by weight, based on 100 parts by weight of total rubber.

Preparation of the laboratory mixture took place in a tangential laboratory mixer. All of the mixtures were used to produce test specimens via vulcanization, these being produced under the vulcanization conditions known to the person skilled in the art, and these test specimens were used to determine the typical rubber-industry properties of the materials. The test specimens were tested by the following test methods:

Shore A hardness at room temperature and 70° C. to DIN 53 505 rebound elasticity at room temperature and 70° C. to DIN 53 512 tensile strength at room temperature to DIN 53 504 elongation at break at room temperature to DIN 53 504 stress values for 300% static elongation at room temperature to DIN 53 504 abrasion values to DIN 53 516

Pneumatic tires of 205/55/R16 size were produced with a tread composed of the mixtures listed in Table 1a, and the tires were used for trials of wet-braking on asphalt (low μ) and concrete (high μ), and also of aquaplaning, and also of rolling resistance. Abrasion was also measured. The properties of the tire using mixture C1 were set at 100, and values greater than 100 for the mixture E1 denote an improvement in the corresponding property. The results of the trials are shown in Table 1.

It was found that the comparative mixture C1, which was vulcanized with conventional addition of elemental sulfur, exhibits about 50% higher abrasion in the laboratory results, see Table 1, and its abrasion property is therefore substantially poorer. This tendency is also apparent in the corresponding tire trials, see Table 1. Other physical properties remain at approximately the same level only in the laboratory, see Table 1, but also in the tire trial, see Table 1. Indeed, they show a significant improvement for rolling resistance.

The following additional Tables of Test Results include prior art Comparison composition examples C1, C2, C3, C4, C5, C6, C7, C8, C9, C10, and C11. The invention composition examples are E1, E2, E3, E4, E5, E6, E7, E8, E9, E10, E11, E12, E13, E14, E15, E16, E17, E18, E19, E20, E21, E22, E23, E24, E25, E26, E27, E28, E29, E30, E31, E32, E33, E34, E35, E36, E37, and E38 representing various embodiments of the inventions.

TABLE 1

| | | Example Number | |
|---|---|---|---|
| | Units | Comparative Example C1 | Example E1 |
| Ingredients Masterbatch | | | |
| NR | phr | 20.000 | 20.000 |
| BR | phr | 35.000 | 35.000 |
| SSBR | phr | 45.000 | 45.000 |
| ULTRASIL VN 3 GR | phr | 85.000 | 85.000 |
| Softener | phr | 45.000 | 45.000 |
| 6PPD | phr | 2.000 | 2.000 |
| TMQ | phr | 2.000 | 2.000 |
| OZONE PROTECTING WAX | phr | 2.000 | 2.000 |
| ZINC OXIDE | phr | 2.500 | 2.500 |
| STEARIC ACID | phr | 2.500 | 2.500 |
| Silane TESPT | phr | 6.754 | 6.754 |
| Finish Batch | | | |
| TBZTD | phr | — | 2.000 |
| DPG | phr | 2.000 | — |
| TBBS | phr | — | 1.810 |
| CBS | phr | 2.000 | — |
| SOLUBLE SULFUR OT 1 | phr | 1.500 | — |
| Sulfur Source | | | |
| Total Sulfur | mmol/phr | 97.8 | 58.1 |
| Free Sulfur | percent | 48.3 | 0.0 |
| Sulfur Donor | percent | 0.0 | 12.8 |
| Silane | percent | 51.7 | 87.2 |
| Physical Properties Cure @ 160° C. for 20 min | | | |
| T-010 | Min | 2.85 | 2.09 |
| T-040 | Min | 6.02 | 3.94 |
| T-090 | Min | 13.65 | 9.78 |
| T-095 | Min | 18.07 | 12.70 |
| Δ Torque | dNm | 14.49 | 16.22 |
| Mooney Viscosity @ 100° C. | Mooney Units | 43 | 43.1 |
| Hardness @ RT | Shore A | 56 | 58 |
| Hardness @ 70° C. | Shore A | 53 | 56 |
| Modulus 50% | MPa | 0.89 | 1.03 |
| Modulus 100% | MPa | 1.54 | 1.91 |
| Modulus 300% | MPa | 5.84 | 7.73 |
| tensile | MPa | 14.9 | 14.5 |
| elongation | percent | 640 | 500 |
| Rebound @ RT | percent | 37 | 43 |
| Rebound @ 70° C. | percent | 51 | 55 |
| D Rebound | percent | 14 | 13 |
| Abrasion DIN53516 RT | mm3 | 85.52 | 45.97 |

TABLE 1-continued

| Tire Test Tire Data: >100 is better | critical difference [%] | C1 | E1 |
|---|---|---|---|
| ABS wet braking (high μ) | 1 | 100 | 99.5 |
| dry braking | 1 | 100 | 100.7 |
| dry handling | 0.5 | 100 | 102.4 |
| Aquaplaning | 3.7 | 100 | 100 |
| rolling resistance | 3.12 | 100 | 102.2 |
| wear | 5 | 100 | 137 |

TABLE 2

| | | Example Number | | | | |
|---|---|---|---|---|---|---|
| | | C2 | E2 | E3 | E4 | C3 |
| | | | | Silane class | | |
| | Units | | class 1 | class 2 | class 1 | |
| Ingredients Masterbatch | | | | | | |
| NR | phr | 30.00 | 30.00 | 30.00 | 30.00 | 30.00 |
| SSBR | phr | 70.00 | 70.00 | 70.00 | 70.00 | 70.00 |
| N 339 | phr | 5.00 | 5.00 | 5.00 | 5.00 | 5.00 |
| ULTRASIL VN 3 GR | phr | 86.00 | 86.00 | 86.00 | 86.00 | 86.00 |
| Softener | phr | 25.00 | 25.00 | 25.00 | 25.00 | 25.00 |
| Antioxidants | phr | 4.00 | 4.00 | 4.00 | 4.00 | 4.00 |
| OZONE PROTECTING WAX | phr | 2.50 | 2.50 | 2.50 | 2.50 | 2.50 |
| Zinc Oxide | phr | 2.00 | 2.00 | 2.00 | 2.00 | 2.00 |
| Stearic Acid | phr | 1.00 | 1.00 | 1.00 | 1.00 | 1.00 |
| Fatty Acid Esters & Zn Soaps | phr | 4.00 | 4.00 | 4.00 | 4.00 | 4.00 |
| TESPT Silane | phr | — | 8.34 | — | — | — |
| TESPD Silane | phr | 8.00 | — | 8.00 | — | 8.00 |
| Silated Core Silane as described in US11/617,663, Example 2 | phr | — | — | — | 7.70 | — |
| Finish Batch | | | | | | |
| TBZTD | phr | — | 1.75 | 1.75 | 1.75 | — |
| DPG | phr | 2.00 | — | — | — | 2.00 |
| TBBS | phr | — | 1.58 | 1.58 | 1.58 | — |
| CBS | phr | 2.00 | — | — | — | 4.00 |
| Sulfur | phr | 1.70 | 0.03 | 0.42 | 0.03 | 0.85 |
| Total | | 243.20 | 241.65 | 240.66 | 241.20 | 240.56 |
| Specific Gravity | g/cm³ | 1.21 | 1.20 | 1.20 | 1.20 | 1.20 |
| Physical Properties | | | | | | |
| T-010 | Min | 2.75 | 1.40 | 1.18 | 1.46 | 0.68 |
| T-040 | Min | 5.42 | 4.35 | 4.32 | 4.32 | 3.29 |
| T-090 | Min | 14.76 | 19.26 | 20.20 | 19.29 | 18.46 |
| T-095 | Min | 19.74 | 23.52 | 24.36 | 23.59 | 23.22 |
| Δ Torque | dNm | 20.73 | 21.01 | 18.92 | 20.44 | 18.03 |
| Mooney Viscosity @ 100° C. | Mooney Units | 56 | 74 | 62 | 76 | 54 |
| Hardness @ RT | Shore A | 69 | 70 | 68 | 70 | 71 |
| Hardness @ 70° C. | Shore A | 62 | 62 | 57 | 61 | 61 |
| Modulus 50% | MPa | 1.40 | 1.45 | 1.18 | 1.31 | 1.32 |
| Modulus 100% | MPa | 2.48 | 2.58 | 1.82 | 2.22 | 2.27 |
| Modulus 300% | MPa | 10.39 | 11.44 | 7.18 | 9.82 | 9.59 |
| tensile | MPa | 15.3 | 14.1 | 13.0 | 14.3 | 16.5 |
| elongation | percent | 441 | 382 | 501 | 431 | 501 |
| Rebound @ RT | percent | 24 | 26 | 23 | 26 | 24 |
| Rebound @ 70° C. | percent | 47 | 49 | 42 | 47 | 44 |
| Sulfur Source | | | | | | |
| Total Sulfur | mmol/phr | 86.5 | 70.1 | 52.9 | 70.1 | 59.9 |
| Free Sulfur | percent | 61.1 | 1.4 | 24.6 | 1.4 | 44.0 |
| Sulfur Donor | percent | 0.0 | 9.3 | 12.1 | 9.3 | 0.0 |
| Silane | percent | 38.9 | 89.4 | 63.3 | 89.4 | 56.0 |
| TIRE PERFORMANCE: First Trial | | | | | | |
| Wet ABS, low-mue asphalt | crit. dif. 1.0% | 100 | 99.7 | 105.1 | 102.9 | 103.8 |
| Handling Ranking | Lower # is better | 4 | 5 | 3 | 1 | 2 |
| Dry Braking ABS | crit. dif. 1.6% | 100 | 98.8 | 99.6 | 99.7 | 100.3 |
| RR (90 km/h) | crit.dif. 3.03% | 100 | 103.5 | 101.5 | 104.0 | 95.0 |
| Wear (ABC), front | T(mean) = 17° C. | 100 | 127 | 140 | 140 | 112 |
| Wear (ABC), rear | T(mean) = 17° C. | 100 | 150 | 170 | 176 | 122 |

TABLE 3

| | Units | Example Number | | | | |
| --- | --- | --- | --- | --- | --- | --- |
| | | C2 | E8 | E5 | E6 | E7 |
| Ingredients | | | | | | |
| Masterbatch | | | | | | |
| NR | phr | 30.00 | 30.00 | 30.00 | 30.00 | 30.00 |
| SSBR | phr | 70.00 | 70.00 | 70.00 | 70.00 | 70.00 |
| N 339 | phr | 5.00 | 5.00 | 5.00 | 5.00 | 5.00 |
| ULTRASIL VN 3 GR | phr | 86.00 | 86.00 | 86.00 | 86.00 | 86.00 |
| Softener | phr | 25.00 | 25.00 | 25.00 | 25.00 | 25.00 |
| Antioxidants | phr | 4.00 | 4.00 | 4.00 | 4.00 | 4.00 |
| OZONE PROTECTING WAX | phr | 2.50 | 2.50 | 2.50 | 2.50 | 2.50 |
| Zinc Oxide | phr | 2.00 | 2.00 | 2.00 | 2.00 | 2.00 |
| Stearic Acid | phr | 1.00 | 1.00 | 1.00 | 1.00 | 1.00 |
| Fatty Acid Esters & Zn Soaps | phr | 4.00 | 4.00 | 4.00 | 4.00 | 4.00 |
| TESPT Silane | phr | — | 8.34 | 7.80 | 7.25 | 6.71 |
| TESPD Silane | phr | 8.00 | — | — | — | — |
| Finish Batch | | | | | | |
| TBZTD | phr | — | 2.00 | 2.00 | 2.00 | 2.00 |
| DPG | phr | 2.00 | — | — | — | — |
| TBBS | phr | — | 1.81 | 1.81 | 1.81 | 1.81 |
| CBS | phr | 2.00 | — | — | — | — |
| Sulfur | phr | 1.70 | — | 0.06 | 0.13 | 0.19 |
| Sulfur Source | | | | | | |
| Total Sulfur | mmol/phr | 86.5 | 70.1 | 67.9 | 65.9 | 63.7 |
| Free Sulfur | percent | 61.1 | 0.0 | 2.8 | 6.2 | 9.4 |
| Sulfur Donor | percent | 0.0 | 10.6 | 10.9 | 11.3 | 11.6 |
| Silane | percent | 38.9 | 89.4 | 86.3 | 82.5 | 79.0 |
| Physical Properties | | | | | | |
| T-010 | Min | 2.75 | 1.40 | 1.39 | 1.39 | 1.42 |
| T-040 | Min | 5.42 | 4.35 | 4.16 | 3.97 | 3.83 |
| T-090 | Min | 14.76 | 19.26 | 19.26 | 18.73 | 18.32 |
| T-095 | Min | 19.74 | 23.52 | 23.51 | 23.05 | 22.84 |
| Δ Torque | dNm | 20.73 | 21.01 | 20.51 | 20.26 | 20.19 |
| Mooney Viscosity @ 100° C. | Mooney Units | 44.4 | 50.9 | 52.9 | 55.3 | 57.5 |
| Cure @ 160° C. for 20 min | | | | | | |
| Hardness @ RT | Shore A | 70 | 72 | 72 | 72 | 71 |
| Hardness @ 70° C. | Shore A | 64 | 67 | 68 | 67 | 65 |
| Modulus 50% | MPa | 1.40 | 1.55 | 1.53 | 1.52 | 1.50 |
| Modulus 100% | MPa | 2.40 | 2.73 | 2.66 | 2.65 | 2.57 |
| Modulus 300% | MPa | 10.25 | 12.19 | 11.94 | 11.77 | 11.62 |
| tensile | MPa | 14.7 | 12.7 | 13.7 | 15.1 | 13.9 |
| elongation | percent | 439 | 338 | 365 | 399 | 377 |
| Rebound @ RT | percent | 28 | 30 | 31 | 30 | 31 |
| Rebound @ 70° C. | percent | 43 | 46 | 46 | 47 | 46 |
| Abrasion | % | 100.00 | 94.78 | 91.89 | 95.86 | 97.31 |

TABLE 4

| | Units | Example Number | | | | |
| --- | --- | --- | --- | --- | --- | --- |
| | | C2 | E8 | E9 | E10 | E11 |
| Ingredients | | | | | | |
| Masterbatch | | | | | | |
| TSR | phr | 30.00 | 30.00 | 30.00 | 30.00 | 30.00 |
| SSBR | phr | 70.00 | 70.00 | 70.00 | 70.00 | 70.00 |
| N 339 | phr | 5.00 | 5.00 | 5.00 | 5.00 | 5.00 |
| Silica VN 3 | phr | 86.00 | 86.00 | 86.00 | 86.00 | 86.00 |
| Softener | phr | 25.00 | 25.00 | 25.00 | 25.00 | 25.00 |
| Antioxidants | phr | 4.00 | 4.00 | 4.00 | 4.00 | 4.00 |
| OZONE PROTECTING WAX | phr | 2.50 | 2.50 | 2.50 | 2.50 | 2.50 |
| Zinc Oxide | phr | 2.00 | 2.00 | 2.00 | 2.00 | 2.00 |
| Stearic Acid | phr | 1.00 | 1.00 | 1.00 | 1.00 | 1.00 |
| Fatty Acid Esters & Zn Soaps | phr | 4.00 | 4.00 | 4.00 | 4.00 | 4.00 |
| TESPT Silane | phr | — | 8.34 | 8.34 | 8.34 | — |
| TESPD Silane | phr | 8.00 | — | — | — | — |
| Silated Core Silane | phr | — | — | — | — | 7.70 |

TABLE 4-continued

|  | Units | Example Number | | | | |
|---|---|---|---|---|---|---|
|  |  | C2 | E8 | E9 | E10 | E11 |
| Finish Batch |  |  |  |  |  |  |
| TBZTD | phr | — | 2.00 | 1.45 | 1.75 | 1.75 |
| DPG | phr | 2.00 | — | — | — | — |
| TBBS | phr | — | 1.81 | 1.31 | 1.58 | 1.58 |
| CBS | phr | 2.00 | — | — | — | — |
| Sulfur | phr | 1.70 | — | 0.07 | 0.03 | 0.03 |
| Total |  | 243.20 | 241.65 | 240.66 | 241.20 | 240.56 |
| Specific Gravity | g/cm$^3$ | 1.19 | 1.19 | 1.19 | 1.19 | 1.19 |
| Sulfur Source |  |  |  |  |  |  |
| Total Sulfur | mmol/phr | 86.5 | 70.1 | 70.2 | 70.1 | 70.1 |
| Free Sulfur | percent | 61.1 | 0.0 | 3.1 | 1.4 | 1.4 |
| Sulfur Donor | percent | 0.0 | 10.6 | 7.7 | 9.1 | 9.1 |
| Silane | percent | 38.9 | 89.4 | 89.2 | 89.4 | 89.4 |
| Physical Properties |  |  |  |  |  |  |
| Cure @ 160° C. for 20 min |  |  |  |  |  |  |
| T-010 | Min | 2.75 | 1.40 | 1.18 | 1.46 | 0.68 |
| T-040 | Min | 5.42 | 4.35 | 4.32 | 4.32 | 3.29 |
| T-090 | Min | 14.76 | 19.26 | 20.20 | 19.29 | 18.46 |
| T-095 | Min | 19.74 | 23.52 | 24.36 | 23.59 | 23.22 |
| Δ Torque | dNm | 20.73 | 21.01 | 18.92 | 20.44 | 18.03 |
| Mooney Viscosity @ 100° C. | Mooney Units | 44.4 | 50.9 | 52.9 | 51 | 53.8 |
| Hardness @ RT | Shore A | 70 | 72 | 70 | 70 | 71 |
| Hardness @ 70° C. | Shore A | 64 | 67 | 64 | 65 | 65 |
| Modulus 50% | MPa | 1.40 | 1.55 | 1.39 | 1.47 | 1.43 |
| Modulus 100% | MPa | 2.40 | 2.73 | 2.30 | 2.53 | 2.36 |
| Modulus 300% | MPa | 10.25 | 12.19 | 10.01 | 11.22 | 10.56 |
| tensile | MPa | 14.73 | 12.67 | 13.51 | 12.34 | 14.03 |
| elongation | percent | 439 | 338 | 412 | 352 | 407 |
| Rebound @ RT | percent | 28 | 30 | 30 | 30 | 29 |
| Rebound @ 70° C. | percent | 43 | 46 | 46 | 47 | 46 |
| Angle Abrasion (11%) | mm3 | 100.00 | 94.89 | 80.29 | 89.30 | 82.86 |

TABLE 5

|  |  | C4 | E12 | E13 | E14 | E15 |
|---|---|---|---|---|---|---|
| NR |  | 30 | 30 | 30 | 30 | 30 |
| SSBR |  | 70 | 70 | 70 | 70 | 70 |
| N 339 |  | 5 | 5 | 5 | 5 | 5 |
| Silica VN3 |  | 86 | 86 | 86 | 86 | 86 |
| Softener |  | 25 | 25 | 25 | 25 | 25 |
| Antioxidant |  | 5.2 | 5.2 | 5.2 | 5.2 | 5.2 |
| Ozone prot. wax |  | 2.0 | 2.0 | 2.0 | 2.0 | 2.0 |
| ZINC OXIDE |  | 2.0 | 2.0 | 2.0 | 2.0 | 2.0 |
| STEARIC ACID |  | 1.0 | 1.0 | 1.0 | 1.0 | 1.0 |
| Fatty acid esters |  | 4.0 | 4.0 | 4.0 | 4.0 | 4.0 |
| Silane TESPD |  | 8.0 | 8.0 | 8.0 | 8.0 | 8.0 |
| SULFUR |  | 1.7 | 0.85 | 0.85 | 0.42 | 0.42 |
| TBzTD |  | — | 1.75 | 1.75 | 2.00 | 2.75 |
| TBBS |  | — | 1.58 | 1.58 | 1.81 | 1.58 |
| CBS |  | 2.0 | — | — | — | — |
| DPG |  | 2.0 | — | 2.5 | 2.5 | 2.5 |
| Sulfur Source |  |  |  |  |  |  |
| Total Sulfur | mmol/phr | 86.5 | 66.3 | 66.3 | 53.8 | 56.6 |
| Free Sulfur | percent | 61.4 | 40.0 | 40.0 | 24.4 | 23.2 |
| Sulfur Donor | percent | 0 | 9.7 | 9.7 | 13.7 | 17.9 |
| Silane | percent | 38.5 | 50.3 | 50.3 | 61.9 | 58.9 |
| Physical Properties |  |  |  |  |  |  |
| T-010 | Min | 1.98 | 2.77 | 2.29 | 2.48 | 2.15 |
| T-040 | Min | 3.21 | 4.55 | 3.35 | 4.28 | 3.83 |
| T-090 | Min | 8.40 | 11.94 | 6.84 | 8.66 | 8.10 |
| T-095 | Min | 11.43 | 16.43 | 9.54 | 11.05 | 10.50 |
| Δ Torque | dNm | 19.27 | 21.75 | 20.08 | 19.19 | 20.51 |
| Mooney Viscosity @ 100° C. | Mooney Units | 66.00 | 65.00 | 54.80 | 58.20 | 58.50 |
| Cure @ 160° C. for 20 min |  |  |  |  |  |  |
| Hardness @ RT | Shore A | 67.80 | 70.40 | 70.60 | 69.90 | 70.75 |
| Hardness @ 70° C. | Shore A | 64.60 | 67.40 | 68.05 | 66.45 | 68.05 |
| Modulus 50% | MPa | 1.40 | 1.60 | 1.60 | 1.50 | 1.61 |

TABLE 5-continued

| | | | | | | |
|---|---|---|---|---|---|---|
| Modulus 100% | MPa | 2.48 | 2.82 | 2.93 | 2.64 | 2.92 |
| Modulus 300% | MPa | 10.39 | 10.61 | 11.36 | 10.26 | 11.06 |
| tensile | MPa | 15.30 | 13.20 | 12.55 | 13.55 | 13.74 |
| elongation | percent | 441.00 | 388.38 | 353.53 | 405.28 | 388.15 |
| Rebound @ RT | percent | 24.20 | 24.90 | 25.90 | 25.70 | 25.50 |
| Rebound @ 70° C. | percent | 47.10 | 49.00 | 49.90 | 48.30 | 48.50 |
| Abrasion DIN53516 RT | mm3 | 125.00 | 95.00 | 99.00 | 88.00 | 86.00 |

TABLE 6

| | | Example Number | |
|---|---|---|---|
| | Units | C5 | E16 |
| Ingredients | | | |
| Masterbatch | | | |
| TSR | phr | 10.00 | 10.00 |
| BR | phr | 35.00 | 35.00 |
| SSBR, oil extended | phr | 75.62 | 75.62 |
| N 339 | phr | 12.00 | 12.00 |
| ULTRASIL VN 3 GR | phr | 85.00 | 85.00 |
| Softener | phr | 11.37 | 11.37 |
| 6PPD | phr | 2.00 | 2.00 |
| TMQ | phr | 2.00 | 2.00 |
| OZONE PROTECTING WAX | phr | 2.50 | 2.50 |
| ZINC OXIDE INDIRECT | phr | 2.50 | 2.50 |
| STEARIC ACID | phr | 1.00 | 1.00 |
| FA ESTERS & Zn SOAPS | phr | 4.00 | 4.00 |
| TESPD Silane | phr | 6.00 | — |
| Silated Core Silane | phr | — | 6.20 |
| Finish Batch | | | |
| MBT | phr | 0.10 | — |
| TBZTD | phr | — | 0.20 |
| DPG | phr | 2.00 | 2.00 |
| TBBS | phr | — | 2.00 |
| CBS | phr | 2.00 | — |
| Sulfur | phr | 2.20 | 1.39 |
| Sulfur Source | | | |
| Total Sulfur | mmol/phr | 94 | 55.6 |
| Free Sulfur | percent | 73.1 | 46.2 |
| Sulfur Donor | percent | 0.0 | 0.8 |
| Silane | percent | 26.9 | 53.0 |
| Physical Properties | | | |
| T-010 | Min | 2.1 | 1.34 |
| T-040 | Min | 4.25 | 4.09 |
| T-090 | Min | 11.72 | 11.06 |
| T-095 | Min | 16.74 | 15.72 |
| Δ Torque | dNm | 18.56 | 18.55 |
| Mooney Viscosity @ 100° C. | Mooney Units | 68.7 | 72.1 |
| Hardness @ RT | Shore A | 69 | 69 |
| Hardness @ 70° C. | Shore A | 66 | 67 |
| Modulus 50% | MPa | 1.45 | 1.47 |
| Modulus 100% | MPa | 2.45 | 2.52 |
| Modulus 300% | MPa | 10.09 | 11.42 |
| tensile | MPa | 15.1 | 15.4 |
| elongation | percent | 454 | 412 |
| Rebound @ RT | percent | 29 | 32 |
| Rebound @ 70° C. | percent | 44 | 47 |
| DIN Abrasion | percent | 100 | 45 |

TABLE 7

| | | C6 | E17 | C7 | E18 | E19 |
|---|---|---|---|---|---|---|
| NR | | 30.000 | 30.000 | 5.000 | 5.000 | 5.000 |
| BR | | — | — | 15.000 | 15.000 | 15.000 |
| SSBR, functionalized | | 70.000 | 70.000 | 80.000 | 80.000 | 80.000 |
| Carbon Black | | 5 | 5 | 5.000 | 5.000 | 5.000 |
| HD Silica | | 60.000 | 60.000 | 75.000 | 75.000 | 75.000 |
| Softener, Resin | | 12 | 12 | 10.000 | 10.000 | 10.000 |
| SYLVARES TR B115 | | — | — | 5.000 | 5.000 | 5.000 |
| Antioxidants | | 5.200 | 5.200 | 5.200 | 5.200 | 5.200 |
| OZONE PROTECT. WAX PE | | 2.000 | 2.000 | 2.000 | 2.000 | 2.000 |
| ZINC OXIDE GRAN | | 2.000 | 2.000 | 2.000 | 2.000 | 2.000 |
| STEARIC ACID | | 1.000 | 1.000 | 1.000 | 1.000 | 1.000 |
| FATTY ACID ESTERS & Zn SOAPS | | — | — | 6.000 | 6.000 | 6.000 |
| NXT LOW V | | 7.320 | 7.320 | — | — | — |
| SI 363 (Class 3) | | — | — | 9.000 | 9.000 | 9.000 |
| MBT | | — | — | 1.000 | 0.500 | 1.000 |
| TBZTD | | — | 2.000 | 0.250 | 2.000 | 2.000 |
| DPG | | 1.600 | 1.600 | — | 2.100 | 2.100 |
| TBBS | | — | 1.810 | 3.500 | 2.770 | 2.770 |
| CBS | | 2.000 | — | — | — | — |
| SULFUR | | 1.700 | 0.420 | 1.700 | 0.440 | 0.440 |
| Sulfur Source | | | | | | |
| Total Sulfur | mmol/phr | 73.3 | 40.6 | 63.2 | 30.2 | 30.2 |
| Free Sulfur | percent | 72.4 | 32.3 | 84.1 | 45.5 | 45.5 |
| Sulfur Donor | percent | 0 | 18.1 | 1.5 | 24.3 | 24.3 |
| Silane | percent | 27.5 | 49.6 | 14.4 | 30.1 | 30.1 |
| Physical Properties | | | | | | |
| Mooney (ML1 + 4) @ 100° C. | mooney units | 59.1 | 61.7 | 80.1 | 84.5 | 85.9 |

TABLE 7-continued

|  |  | C6 | E17 | C7 | E18 | E19 |
|---|---|---|---|---|---|---|
| MDR 2000 160° C. |  |  |  |  |  |  |
| Time (Cure State) - 5 | min | 1.26 | 1.77 | 3.22 | 1.77 | 1.35 |
| Time (Cure State) - 10 | min | 1.54 | 2.2 | 3.73 | 2.24 | 1.73 |
| Time (Cure State) - 40 | min | 1.97 | 3.19 | 4.84 | 3.61 | 2.9 |
| Time (Cure State) - 90 | min | 3.87 | 5.92 | 7.6 | 7.85 | 7.03 |
| Time (Cure State) - 95 | min | 5.07 | 7.02 | 8.9 | 9.21 | 8.36 |
| MHF-ML | dNm | 15.39 | 12.62 | 16.68 | 14.2 | 14.48 |
| Vulcanization 20 min @ 160° C. |  |  |  |  |  |  |
| Hardness Shore A RT | shore A | 62.8 | 60.1 | 65 | 61.7 | 63.15 |
| Hardness Shore A 70° C. | shore A | 61.2 | 58.1 | 62.5 | 59.65 | 60.35 |
| Resilience RT | percent | 34 | 33.5 | 27 | 32.3 | 31.2 |
| Resilience 70° C. | percent | 62.9 | 59.1 | 64.3 | 63.1 | 62.8 |
| Tensile Strength | MPa | 13.476 | 16.354 | 15.479 | 17.623 | 16.254 |
| Elongation at Break | percent | 333.786 | 450.547 | 318.988 | 372.159 | 341.233 |
| Stress (Elongation) - 50 | MPa | 1.446 | 1.168 | 1.564 | 1.331 | 1.406 |
| Stress (Elongation) - 100 | MPa | 2.808 | 2.112 | 3.195 | 2.661 | 2.796 |
| Stress (Elongation) - 300 | MPa | 13.219 | 10.33 | 15.995 | 14.924 | 15.128 |
| Abrasion DIN53516 RT | mm3 | 91 | 52 | 103 | 66 | 70 |

TABLE 8

|  | E20 | E21 | E22 | E23 | E24 | E25 | E26 |
|---|---|---|---|---|---|---|---|
| TSR | 20.000 | 20.000 | 20.000 | 20.000 | 20.000 | 20.000 | 20.000 |
| BR | 44.000 | 44.000 | 44.000 | 44.000 | 44.000 | 44.000 | 44.000 |
| SSBR | 36.000 | 36.000 | 36.000 | 36.000 | 36.000 | 36.000 | 36.000 |
| Silica ZEOSIL 1165 MP | 95.000 | 95.000 | 95.000 | 95.000 | 95.000 | 95.000 | 95.000 |
| Softener | 45.000 | 45.000 | 45.000 | 45.000 | 45.000 | 45.000 | 45.000 |
| 6PPD | 2.000 | 2.000 | 2.000 | 2.000 | 2.000 | 2.000 | 2.000 |
| TMQ | 2.000 | 2.000 | 2.000 | 2.000 | 2.000 | 2.000 | 2.000 |
| OZONE PROTECT. WAX PE | 2.000 | 2.000 | 2.000 | 2.000 | 2.000 | 2.000 | 2.000 |
| ZINC OXIDE GRAN | 2.500 | 2.500 | 2.500 | 2.500 | 2.500 | 2.500 | 2.500 |
| STEARIC ACID | 2.500 | 2.500 | 2.500 | 2.500 | 2.500 | 2.500 | 2.500 |
| Silane TESPT | — | 6.600 | 6.600 | 6.600 | 6.600 | — | — |
| Silane TESPD | 8.080 | — | — | — | — | 5.920 | 5.920 | 5.920 |
| TBZTD | — | 1.750 | — | — | — | — | — |
| DPG | 2.000 | — | — | — | — | — | — |
| TBBS | — | 1.580 | 1.580 | 1.580 | 1.580 | 1.580 | 1.580 |
| CBS | 1.600 | — | — | — | — | — | — |
| Rhenogran SDT 50 | — | — | 4.710 | — | — | 4.710 | — | — |
| DIPDIS | — | — | — | — | 1.370 | — | — | 1.370 |
| Sulfur | 2.000 | — | — | — | — | 0.660 | 0.660 | 0.660 |
| Rhenocure ZDT/s | — | — | — | 3.550 | — | — | 3.550 | — |

|  |  | C8 | E20 | E21 | E22 | E23 | E24 | E25 | E26 |
|---|---|---|---|---|---|---|---|---|---|
| Sulfur Source |  |  |  |  |  |  |  |  |  |
| Total Sulfur | mmol/phr | 96.2 | 56.1 | 56.1 | 56.1 | 56.1 | 51.7 | 51.7 | 51.7 |
| Free Sulfur | percent | 65 | 0.0 | 0.0 | 0 | 0 | 39.8 | 39.8 | 39.8 |
| Sulfur Donor | percent | 0 | 11.5 | 11.5 | 11.5 | 11.5 | 12.4 | 12.4 | 12.4 |
| Silane | percent | 35 | 49.6 | 88.5 | 88.5 | 88.5 | 47.7 | 47.7 | 47.7 |
| Physical Properties |  |  |  |  |  |  |  |  |  |
| Mooney (ML1 + 4) | mooney units | 44.9 | 58.7 | 68 | 59.5 | 59.3 | 96.1 | 60.5 | 68.2 |
| MDR 2000 160° C. |  |  |  |  |  |  |  |  |  |
| Time (Cure State) - 5 | min | 0.41 | 0.26 | 0.21 | 0.26 | 0.22 | 1.4 | 0.23 | 0.19 |
| Time (Cure State) - 10 | min | 2.37 | 0.63 | 0.51 | 0.63 | 0.5 | 1.63 | 0.62 | 0.62 |
| Time (Cure State) - 40 | min | 6.5 | 2.84 | 2.76 | 2.62 | 2.68 | 2.37 | 4.14 | 3.48 |
| Time (Cure State) - 95 | min | 17.6 | 14.67 | 15.72 | 18.3 | 12.83 | 7.65 | 14.19 | 10.27 |
| MHF-ML | dNm | 17.49 | 21.32 | 22.56 | 21.02 | 18.89 | 19 | 21.13 | 19.75 |
| Vulcanization 20 min @ 160° C. |  |  |  |  |  |  |  |  |  |
| Hardness Shore A RT | shore A | 61.25 | 63.8 | 64.2 | 63.6 | 62.55 | 67.45 | 64.3 | 64.1 |
| Hardness Shore A 70° C. | shore A | 57.35 | 60.5 | 61.25 | 59.35 | 58.7 | 64.2 | 60.85 | 60.75 |
| Resilience RT | percent | 35 | 38.9 | 38.9 | 37.2 | 36.8 | 39.5 | 38 | 36.5 |
| Resilience 70° C. | percent | 46.2 | 47.8 | 46.7 | 44.7 | 45.3 | 47 | 46.3 | 44.1 |
| Tensile Strength | MPa | 13.705 | 12.133 | 14.517 | 13.584 | 13.609 | 15.364 | 15.087 | 13.943 |
| Elongation at Break | percent | 698.534 | 486.684 | 556.151 | 559.482 | 581.13 | 624.856 | 585.484 | 602.256 |
| Stress (Elongation) - 50 | MPa | 0.93 | 1.054 | 1.098 | 1.051 | 1.016 | 1.194 | 1.12 | 1.103 |
| Stress (Elongation) - 100 | MPa | 1.446 | 1.668 | 1.721 | 1.615 | 1.579 | 1.783 | 1.758 | 1.663 |
| Stress (Elongatian) - 300 | MPa | 4.924 | 6.734 | 6.825 | 6.285 | 6.05 | 6.254 | 6.608 | 5.877 |

TABLE 8-continued

| | | | | | | | | | |
|---|---|---|---|---|---|---|---|---|---|
| Break Energy Density | J/cm3 | 38.794 | 22.645 | 31.513 | 29.657 | 31.083 | 38.241 | 34.484 | 32.944 |
| DIN Abrasion | mm$^3$ | 74.47 | 29.53 | 30.8 | 29.11 | 32.91 | 40.77 | 30.9 | 32.61 |

TABLE 9

| | | C9 | E27 | E28 | C10 | E29 | E30 |
|---|---|---|---|---|---|---|---|
| Sidewall | | | | | | | |
| TSR | | 50.000 | 50.000 | 50.000 | 50.000 | 50.000 | 50.000 |
| BR | | 50.000 | 50.000 | 50.000 | 50.000 | 50.000 | 50.000 |
| N 339 | | 15.000 | 13.000 | 13.000 | 45.000 | 45.000 | 45.000 |
| Silica VN3 | | 30.000 | 30.000 | 30.000 | — | — | — |
| Softener | | 4.000 | 4.000 | 4.000 | 4.000 | 4.000 | 4.000 |
| Resins | | 6.000 | 6.000 | 6.000 | 6.000 | 6.000 | 6.000 |
| Antioxidant | | 4.000 | 4.000 | 4.000 | 4.000 | 4.000 | 4.000 |
| OZONE PROTECT. WAX PE | | 2.000 | 2.000 | 2.000 | 2.000 | 2.000 | 2.000 |
| ZINC OXIDE GRAN | | 3.000 | 3.000 | 3.000 | 3.000 | 3.000 | 3.000 |
| STEARIC ACID | | 2.000 | 2.000 | 2.000 | 2.000 | 2.000 | 2.000 |
| TESPT 50% ON CARBON BLACK | | 4.000 | 4.000 | 4.000 | — | 6.842 | 6.842 |
| Nanoprene B PM0OH VP | | — | — | — | — | — | 15.000 |
| Nanoprene B M15OH VP | | — | — | — | — | 15.000 | — |
| TBZTD | | — | 1.350 | 1.100 | — | 1.632 | 1.632 |
| DPG | | 0.500 | — | — | — | — | — |
| TBBS | | — | 1.220 | 1.000 | | | |
| CBS | | 1.300 | — | — | 0.700 | 0.700 | 0.700 |
| Sulfur | | 1.300 | 0.430 | 0.460 | 1.400 | — | — |
| Sulfur Source | | | | | | | |
| Total Sulfur | mmol/phr | 55.6 | 33.4 | 33.5 | 43.8 | 31.7 | 31.7 |
| Free Sulfur | % | 73.0 | 40.4 | 43.2 | 0.0 | 0.0 | 0.0 |
| TBzTD | % | 0.0 | 14.9 | 12.2 | 0.0 | 19.0 | 19.0 |
| Silane | % | 27.0 | 44.7 | 44.7 | 100.0 | 81.0 | 81.0 |
| Physical Properties | | | | | | | |
| Mooney (ML1 + 4) | mooney units | 53.9 | 64.9 | 66.4 | 50.1 | 48.9 | 46 |
| MDR 2000 160° C. | | | | | | | |
| Time (Cure State) - 5 | min | 1.3603 | 1.74 | 1.46 | 2.5415 | 1.1677 | 1.2082 |
| Time (Cure State) - 10 | min | 2.6073 | 2.27 | 2.24 | 3.423 | 1.5213 | 1.5598 |
| Time (Cure State) - 40 | min | 4.6823 | 3.09 | 3.17 | 4.674 | 3.052 | 3.0893 |
| Time (Cure State) - 95 | min | 8.2763 | 11.16 | 12.01 | 9.0702 | 23.6263 | 23.5252 |
| MHF-ML | dNm | 10.14 | 11.46 | 10.27 | 9.63 | 11.64 | 11.33 |
| Vulcanization to t95 @ 160° C. | | | | | | | |
| Hardness Shore A RT | shore A | 50.25 | 54.2 | 51.9 | 52.7 | 57.55 | 57.45 |
| Hardness Shore A 70° C. | shore A | 47.9 | 51.8 | 49.25 | 48.35 | 54.5 | 54.65 |
| Resilience RT | percent | 49.9 | 55 | 52.7 | 45.625 | 47.75 | 43.405 |
| Resilience 70° C. | percent | 55.35 | 63.1 | 59.2 | 51.69 | 59.9 | 59.66 |
| Tensile Strength | MPa | 16.9033 | 12.984 | 12.996 | 18.6567 | 11.8 | 13.5567 |
| Elongation at Break | percent | 740.4 | 502.885 | 553.796 | 696.4333 | 350.1333 | 398.4333 |
| Stress (Elongation) - 50 | MPa | 0.7267 | 0.902 | 0.817 | 0.82 | 1.0933 | 1.1067 |
| Stress (Elongation) - 100 | MPa | 1.0767 | 1.458 | 1.273 | 1.2533 | 1.93 | 1.9667 |
| Stress (Elongation) - 300 | MPa | 4.2967 | 6.512 | 5.47 | 6.12 | 10.6767 | 10.1733 |
| Din Abrasion | | 49.57 | 34.95 | 37.35 | 48.01 | 28.99 | 22.4 |

TABLE 10

| | C11 | E31 | E32 | E33 | E34 | E35 | E36 | E37 | E38 |
|---|---|---|---|---|---|---|---|---|---|
| Truck Tread | | | | | | | | | |
| NR | 100.000 | 100.000 | 100.000 | 100.000 | 100.000 | 100.000 | 100.000 | 100.000 | 100.000 |
| N 121 | 5.000 | 5.000 | 5.000 | 5.000 | 5.000 | 5.000 | 5.000 | 5.000 | 5.000 |
| ZEOSIL 1165 MP | 50.000 | 50.000 | 50.000 | 50.000 | 50.000 | 50.000 | 50.000 | 50.000 | 50.000 |
| OZONE PROTECT. WAX PE | 2.500 | 2.500 | 2.500 | 2.500 | 2.500 | 2.500 | 2.500 | 2.500 | 2.500 |
| Silane TESPT | 5.000 | 4.727 | 4.343 | 4.343 | 3.959 | — | — | — | — |
| Silane TESPD | — | — | — | — | — | 8.482 | 7.702 | 7.792 | 7.103 |
| Antioxidants | 2.500 | 2.5 | 2.5 | 2.5 | 2.5 | 2.500 | 2.500 | 2.500 | 2.500 |
| ZINC OXIDE GRAN | 3.000 | 3.000 | 3.000 | 3.000 | 3.000 | 3.000 | 3.000 | 3.000 | 3.000 |
| STEARIC ACID | 2.000 | 2.000 | 2.000 | 2.000 | 2.000 | 2.000 | 2.000 | 2.000 | 2.000 |
| Processing Aid | 4.000 | 4.000 | 4.000 | 4.000 | 4.000 | 4.000 | 4.000 | 4.000 | 4.000 |
| TBZTD | — | 2.067 | 2.067 | 2.067 | 2.067 | 2.067 | 2.067 | 2.067 | 2.067 |
| DPG | 1.000 | 1.000 | 1.000 | — | 1.000 | 1.000 | 1.000 | — | 1.000 |

TABLE 10-continued

|  |  | C11 | E31 | E32 | E33 | E34 | E35 | E36 | E37 | E38 |
|---|---|---|---|---|---|---|---|---|---|---|
| TBBS |  | 1.900 | 1.000 | 1.900 | 1.900 | 1.900 | 1.900 | 1.900 | 1.900 | 1.900 |
| SOLUBLE SULFUR OT 1 |  | 1.800 | — | 0.079 | 0.079 | 0.158 | — | 0.079 | 0.079 | 0.158 |
| Sulfur Source |  |  |  |  |  |  |  |  |  |  |
| Total Sulfur | mmol/phr | 93.8 | 43.1 | 42.7 | 42.7 | 42.3 | 42.9 | 42.8 | 42.5 | 42.1 |
| Free Sulfur | % | 60.0 | 0.0 | 5.8 | 5.8 | 11.7 | 0.0 | 5.800 | 5.800 | 11.700 |
| TBzTD | % | 0.0 | 17.6 | 17.7 | 17.8 | 17.9 | 17.7 | 17.900 | 17.900 | 18.000 |
| Silane | % | 40 | 82.4 | 75.4 | 75.4 | 70.4 | 82.3 | 76.3 | 76.3 | 70.2 |
| Physical Properties |  |  |  |  |  |  |  |  |  |  |
| Mooney (ML1 + 4) | mooney units | 53.4 | 51.8 | 51.2 | 52.5 | 50.4 | 45.7 | 46.5 | 49.2 | 47.2 |
| MDR 2000 160° C. |  |  |  |  |  |  |  |  |  |  |
| Time (Cure State) - 5 | min | 1.3748 | 1.5358 | 1.5517 | 1.8198 | 1.5935 | 1.7425 | 1.9427 | 2.6123 | 1.997 |
| Time (Cure State) - 40 | min | 2.4163 | 3.4834 | 3.2277 | 3.7702 | 3.0482 | 6.3567 | 5.1857 | 6.6093 | 4.389 |
| Time (Cure State) - 95 | min | 6.1588 | 15.0135 | 13.7017 | 17.7655 | 12.6697 | 23.1908 | 21.8623 | 25.2527 | 20.7663 |
| MHF-ML | Nm | 21.89 | 17.83 | 17.8 | 16.99 | 17.74 | 16.75 | 18.02 | 15.88 | 18.74 |
| Vulcanization to t95 @ 160° C. |  |  |  |  |  |  |  |  |  |  |
| Hardness Shore A RT | shore A | 67.35 | 63.7 | 63.15 | 61.5 | 63.3 | 63.9 | 64.55 | 63.4 | 66.6 |
| Hardness Shore A 70° C. | shore A | 67.1 | 61.1 | 60.35 | 59.15 | 60.75 | 58.05 | 81.4 | 59.3 | 62.55 |
| Resilience RT | percent | 56.525 | 52.42 | 51.87 | 52.1 | 51.825 | 39.92 | 42.755 | 44.755 | 44.275 |
| Resilience 70° C. | percent | 68.6 | 66.375 | 66.915 | 66.37 | 65.88 | 51.005 | 55.16 | 59.665 | 57.66 |
| Tensile Strength | mPa | 1.79 | 1.42 | 1.4867 | 1.4233 | 1.37 | 1.3033 | 1.43 | 1.4 | 1.52 |
| Elongation at Break | mPa | 3.6033 | 2.7567 | 2.9067 | 2.78 | 2.6333 | 2.1333 | 2.5033 | 2.57 | 2.79 |
| Stress (Elongation) - 50 | mPa | 16.81 | 16.1967 | 17.1233 | 16.21 | 15.9233 | 11.6633 | 13.7267 | 14.7333 | 15.1733 |
| Stress (Elongation) - 100 | MPa | 25.4833 | 23.18 | 23.0933 | 23.3967 | 24.03 | 21.5433 | 21.57 | 23.2667 | 19.8433 |
| Stress (Elongation) - 300 | Percent | 475.0333 | 436.8667 | 416.8667 | 439.9667 | 454.2 | 513.3667 | 461.3667 | 467.5333 | 402.5333 |
| Din Abrasion | mm3 | 110 | 58 | 70 | 64 | 69 | 91 | 80 | 67 | 64 |

Additional Information for the Above Tables:
  The 'silated core silane' is always the same and described in Table 2.
  A representative of class 3 silane, SI363, is used in compound E17 and E18.
  Table 1: passenger car tread compound including tire test.
  Table 2: passenger car tread compound including tire test, comparison of 3 types of silane and comparison with known efficient cure system C3 (low sulfur content, no sulfur donor).
  Table 3: passenger car tread compound, variations in sulfur dosage, less important.
  Table 4: passenger car tread compound, variations in sulfur dosage and silane type.
  Table 5: passenger car tread compound, variations in sulfur and sulfur donor dosage for 'class 2 silane.'
  Table 6: passenger car tread compound, replication with silated core silane in different compound, less important.
  Table 7: passenger car tread compound, use of class 2 and class 3 silane.
  Table 8: passenger car tread compound, use of different dithiophosphates as sulfur donor.
  Table 9: sidewall compound, use of silica or OH-group containing microgel as filler.
  Table 10: truck tread compound with two types of silane.
  If abrasion is given as lab data in relative (%) or absolute (mm$^3$) figures it is representing the weight loss during the test meaning that lower values denote improvement in all tables with physical data.

Although only a few embodiments of the present invention have been shown and described, it is to be understood that many changes and modifications may be made thereunto without departing from the spirit and scope of the invention as defined in the appended claims.

What is claimed is:

1. A rubber mixture having the composition comprising:
from 30 to 100 phr of at least one diene rubber;
from 20 to 200 phr of a filler;
from 0 to 200 phr of other or further additives;
wherein for class 1 silanes for PC tire tread applications:
a vulcanization system of sulfur comprising elemental sulfur, sulfur donor and silane with a sulfur concentration caused by these ingredients;
said sulfur concentration is 0.05 to 0.075 moles per 100 parts by weight of the rubber elastomer; free sulfur is 0 to 10 mole %; sulfur donor is 5 to 13 mole %; silane is 75 to 90mole %;
if S to Si-ratio in silane is >1.6, no of Si-atoms >1, Mw per Si-atom ratio <390 g/mol; silica amounts to 45 to 150 phr; and
0.01 to 10 phr of at least one vulcanization accelerator;
and all of the mole percentages are referred to the sulfur concentration of the vulcanization system.

2. A rubber mixture having the composition comprising:
from 30 to 100 phr of at least one diene rubber;
from 20 to 200 phr of a filler;
from 0 to 200 phr of other or further additives;
wherein for class 2 silanes for PC tire tread applications:
a vulcanization system of sulfur comprising elemental sulfur, sulfur donor and silane with a sulfur concentration caused by these ingredients;
said sulfur concentration is 0.035 to 0.07 moles per 100 parts by weight of the rubber elastomer; free sulfur is 20 to 50 mole %; sulfur donor is 5 to 20 mole %; silane 50 to 70 mole %; if S:Si <1.6, no of Si atoms >=1 Mw per Si-atom ratio <390 g/mol; silica amounts to 45 to 150 phr; and
0.01 to 10 phr of at least one vulcanization accelerator;
and all of the mole percentages are referred to the sulfur concentration of the vulcanization system.

3. A rubber mixture having the composition comprising:
from 30 to 100 phr of at least one diene rubber;
from 20 to 200 phr of a filler;
from 0 to 200 phr of other or further additives, wherein for tire sidewall application:
a vulcanization system of sulfur comprising elemental sulfur, sulfur donor and silane with a sulfur concentration caused by these ingredients;
said sulfur concentration is 0.025 to 0.05 moles per 100 parts by weight of the rubber elastomer; free sulfur is 0 to 55 mole %; sulfur donor is 8 to 20 mole %; silane is 40 to 95 mole %;
if S to Si-ratio in silane is >1.6, no of Si-atoms >1, Mw per Si-atom ratio <390 g/mol; silica amounts to 10 to 50 phr; and
0.01 to 10 phr of at least one vulcanization accelerator;
and all of the mole percentages are referred to the sulfur concentration of the vulcanization system.

4. A rubber mixture having the composition comprising:
from 30 to 100 phr of at least one diene rubber;
from 20 to 200 phr of a filler;
from 0 to 200 phr of other or further additives, wherein for truck tread applications:
a vulcanization system of sulfur comprising elemental sulfur, sulfur donor and silane with a sulfur concentration caused by these ingredients;
said sulfur concentration is 0.025 to 0.05 moles per 100 parts by weight of the rubber elastomer; free sulfur is 0 to 55 mole %; sulfur donor is 8 to 15 mole %; silane is 40 to 95 mole %;
if Mw per Si-atom ratio <390 g/mol; silica amounts to 20 per 60 phr; and
0.01 to 10 phr of at least one vulcanization accelerator;
and all of the mole percentages are referred to the sulfur concentration of the vulcanization system.

5. The rubber mixture as claimed in claim 1, further comprising additional features:
wherein the compound comprises a sulfenamide type of accelerator, in a sulfur donor to sulfenamide accelerator molar ratio of 0.35 to 0.6;
wherein the sulfur donors are thiruam disulfides or thiophosphates;
wherein the silanes are TESPT or TESPD or mercaptosilanes, which can be blocked or unblocked, or silated core silanes;
wherein at least one filler has OH groups on the filler surface like Silica, other metal oxides, or microgels;
wherein unsaturated elastomers comprises SBR, BR, NR, IR, SIR, SIBR, IBR, EPDM, or mixtures thereof; and/or wherein softener comprises mineral oils, vegetable oils, esters, low Mw-polymers, or blends thereof.

6. The rubber mixture as claimed in claim 1, wherein at least one diene rubber has been selected from the group consisting of natural polyisoprene, synthetic polyisoprene, polybutadiene, styrene-butadiene copolymer, solution-polymerized styrene-butadiene copolymer, emulsion-polymerized styrene-butadiene copolymer, styrene-isoprene-butadiene terpolymer, butyl rubber, halobutyl rubber, ethylene-propylene-diene rubber, chloroprene rubber, and the mixtures thereof.

7. The rubber mixture as claimed in claim 1, wherein the quantitative proportion of the entire amount of vulcanization accelerator is from 1 to 6 phr.

8. The rubber mixture as claimed in claim 1, wherein the vulcanization accelerator is at least one accelerator selected from the group consisting of the sulfenamide accelerators and the thiuram accelerators, excluding sulfur donors.

9. The rubber mixture as claimed in claim 8, wherein the vulcanization accelerators selected from the group consisting of sulfenamide accelerators is N-cyclohexyl-2-benzothiazolsulfenamide N-tert-butyl-2-benzothiazolsulfenamide, and the mixtures thereof.

10. The rubber mixture as claimed in claim 9, wherein the vulcanization accelerator selected from the group consisting of the sulfenamide accelerators is N-tert-butyl-2-benzothiazolsulfenamide.

11. The rubber mixture as claimed in claim 1, wherein the sulfur donor is selected from the group consisting of thiuram disulfides, thiophosphates, and the mixtures thereof.

12. The rubber mixture as claimed in claim 11, wherein the sulfur donor is tetrabenzylthiuramdisulfide.

13. The rubber mixture as claimed in claim 11, wherein the sulfur donor is selected from the group consisting of thiophosphates.

14. The rubber mixture as claimed in claim 13, wherein the sulfur donor is Bis (O, O-2-ethylhexyl-thiophosphatyl) polysulfide (SDT).

15. The rubber mixture as claimed in claim 1, which is devoid of elemental sulfur and to which no elemental sulfur is added.

16. The rubber mixture as claimed in claim 1, wherein the quantitative proportion of the additives is from 10 to 200 phr.

17. The rubber mixture as claimed in claim 1, wherein the quantitative proportion of the additives comprises from 20 to 200 phr of at least one filler.

18. The rubber mixture as claimed in claim 17, wherein at least 10 phr of filler contains silane reactive groups on the surface.

19. The rubber mixture as claimed in claim 17, wherein the filler is amorphous silica.

20. The rubber mixture as claimed in claim 17, wherein the filler is amorphous silica and/or carbon black.

21. The rubber mixture as claimed in claim 17, wherein the filler is surface modified polymer microgel.

22. The rubber mixture as claimed in claim 17, wherein the filler is surface modified polymer mircogel and/or carbon black.

23. The rubber mixture as claimed in claim 20, wherein the carbon black has an iodine absorption number of from 80 to 300 g/kg and a DBP number from 115 to 200 cm3/100 g.

24. The rubber mixture as claimed in claim 17, wherein the filler comprises amorphous silica, or carbon black or surface modified polymer microgel.

* * * * *